United States Patent Office 3,475,423
Patented Oct. 28, 1969

3,475,423
1,3-BENZOTHIAZINES
John Krapcho, Somerset, N.J., assignor to E. R. Squibb & Sons, Inc., New York, N.Y., a corporation of Delaware
No Drawing. Filed Mar. 27, 1967, Ser. No. 625,970
Int. Cl. C07d 93/00
U.S. Cl. 260—243
6 Claims

ABSTRACT OF THE DISCLOSURE

A pharmaceutical composition having the formula

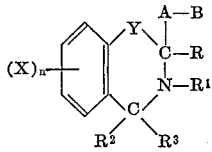

optically active isomers and salts thereof, wherein Y is thia (—S—), sulfone (—SO$_2$—), sulfoxide (—SO—), and oxa (—O—); R is aryl; R$^1$ is hydrogen, alkyl, haloalkyl, benzyl, X-substituted benzyl, allyl, propargyl, cinnamyl or cycloalkylalkylene; R$^2$ and R$^3$ taken together are oxa and separately are hydrogen; X is hydrogen, lower alkyl, lower alkoxy, amino, dialkylamino, halo, lower alkylthio, hydroxy, cyano, nitro or trifluoromethyl; n is 1 to 2; A is lower alkylene; and B is a basic nitrogen-containing radical. These compounds are useful as central nervous system stimulant or as mydriatic agents. These compounds are also useful as disinfectants, especially the quaternary salts thereof.

---

This invention relates to new chemical compounds having valuable therapeutic properties and processes for the preparation thereof.

The therapeutically active compounds of this invention are of the general Formula I:

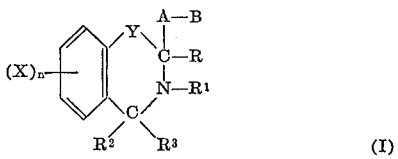

optically active isomers and salts thereof, wherein Y is thia (—S—), sulfone (—SO$_2$—), sulfoxide (—SO—), and oxa (—O—); R is aryl; R$^1$ is hydrogen, alkyl, haloalkyl, aralkyl, X-substituted aralkyl, allyl, propargyl, cinnamyl or cycloalkylalkylene; R$^2$ and R$^3$ taken together are oxa and separately are hydrogen; X is hydrogen, lower alkyl, lower alkoxy, amino, dialkylamino, halo, lower alkylthio (e.g., hexylthio, methylthio or propylthio), hydroxy, cyano, nitro or trifluoromethyl; n is one to four; A is lower alkylene (preferably ethylene and propylene); and B is a basic nitrogen-containing radical.

Among the suitable radicals represented by the symbol B are amino, (lower alkyl)amino, such as methyl amino, ethyl amino, and the like, di(lower alkyl)amino, such as dimethyl amino, diethyl amino, and the like, (hydroxy-lower alkyl)amino, such as hydroxy-ethylamino, and the like, di(hydroxy-lower alkyl)amino, such as di(hydroxy-ethyl)amino, and the like, (phenyl-lower alkyl)amino, such as benzyl amino, phenethyl amino, and the like, (lower alkyl), (phenyl-lower alkyl)amino, and saturated nitrogen heterocyclics having five to seven atoms in the ring and which may have one additional hetero atom in the ring. A substituent may also be attached to the nitrogen heterocyclic.

Heterocyclics represented by B are those having the formula

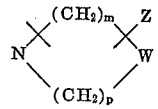

in which W represent NZ', CH$_2$, O or S, m represents an integer from one to four, p represents an integer from zero to three, the total of m+p being less than seven, Z represents hydrogen, lower alkyl and lower alkoxy, and Z' represents hydrogen, lower alkyl, lower alkoxy, hydroxy-lower alkyl, alkanoyloxy-lower alkyl, alkanoyloxy-lower alkoxy lower alkyl, hydroxy-lower alkoxy-lower alkyl di(lower alkyl)amino-lower alkyl, di(lower alkyl)amino-lower alkoxy-lower alkyl, allyl, propargyl, cycloalkyl, cycloalkyl-lower alkyl, X-substituted phenyl, X-substituted phenyl-lower alkyl, and X-substituted phenyl-lower alkenyl (e.g., p-chlorocinnamyl). These may be exemplified by piperidyl [i.e., piperidino, 2-piperidyl, 3-piperidyl and 4-piperidyl]; (lower alkyl)piperidyl [e.g., 2,3, or 4-(lower alkyl)piperidino or 2,3 or 4-(N-lower alkyl)piperidyl; or 2,3 or 4-(N-lower alkyl-2,3 or 4-(lower alkyl)piperidyl]; hydroxy piperidyl, such as hydroxy piperidino; (lower alkoxy)piperidyl; pyrrolidyl; (lower alkyl)pyrrolidyl; (lower alkoxy)pyrrolidyl; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazyl; (lower alkyl)piperazyl e.g., N$^4$-methylpiperazino); di(lower alkyl)piperazyl; (lower alkoxy)piperazyl; (hydroxy-lower alkyl)piperazyl [e.g., N$^4$-(2-hydroxyethyl)piperazino]; alkanoyloxy lower-alkyl piperazyl [e.g., N$^4$-(2-acetoxyethyl)piperazino, N$^4$-(2-heptanoyloxyethyl)piperazino, N$^4$-(2-dodecanoyloxyethyl)piperazino]; (hydroxy-lower alkoxy-lower alkyl)piperazyl [e.g., N$^4$-(2-hydroxyethoxyethyl)piperazino]; di(lower alkyl)amino-(lower alkyl)piperazyl [e.g., N$^4$-dimethylaminoethylpiperazino]; di(lower alkyl)amino-(lower alkoxy-lower alkyl)piperazyl [e.g., N$^4$-(2-dimethylaminoethoxyethyl)piperazino]; aryl piperazino [e.g., N$^4$-(o-methoxyphenyl)piperazino] and homopiperazyl and substituted homopiperazyl [e.g., N$^4$-ethylhomopiperazino, N$^4$-benzylhomopiperazino, N$^4$-(p-hydroxyphenyl)homopiperazino, N$^4$ - (o-acetoxybenzyl)homopiperazino and N$^4$-(hydroxyethyl)homopiperazino]. The terms "lower alkyl," "lower alkoxy," and "lower alkylene" as employed herein, include both straight and branched chain radicals of less than eight carbon atoms. The term "alkanoyloxy" includes radicals of up to fourteen carbon atoms.

The term "aryl" as employed herein includes mononuclear and dinuclear radicals such as phenyl; (X)$_m$-substituted phenyl (including 3,4-methylenedioxyphenyl; 3,4-ethylenedioxyphenyl or pentafluorophenyl, and so forth), furyl, thienyl, pyridyl or naphthyl, and m is one to five.

The particularly preferred compounds are those wherein X is hydrogen, Y is sulfur, R is phenyl, A is ethylene and B is dimethylamino.

As to the salts, those coming within the purview of this invention include the non-toxic acid-addition salts and the quaternary ammonium salts. Acids useful for preparing these acid-addition salts include, inter alia, inorganic acids, such as the hydrohalic acids (e.g., hydrochloric and hydrobromic acid, sulfuric acid, nitric acid, and phosphoric acid, and organic acids, such as maleic, tartaric, citric, acetic, salicyclic, succinic acid, theophylline, 8-chlorotheophylline, fumaric, benzoic, pamoic, nicotinic, methanesulfonic or cyclohexanesulfamic. The quaternary ammonium salts include those formed with lower alkyl halides (e.g., methyl bromide, ethyl chloride and propyl iodide), benzyl halides (e.g., benzyl chloride) and di-lower alkyl sulfates (e.g., dimethyl sulfate).

The compounds of this invention, including the optically active forms and the acid-addition salts thereof, are therapeutically active compounds which possess central nervous system stimulant activity and hence are utilizable in the treatment of depression and also have control of obesity. Thus, the compounds of this invention can be administered perorally, the dosage for such treatment being adjusted for the activity of the particular compound employed. It is understood that the dosage may be administered from 0.01 to 10 mgs. per kg. of the mamallian host being treated. The compounds of this invention also possess mydriatic activity and may be utilized in dosage amounts as set forth above. These compounds can be formulated in liquid, tablet, capsule, and the like, as is known in the art.

The compounds of this invention can be prepared by the following novel process. A compound having the following formula:

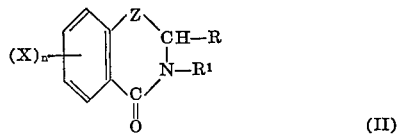

wherein Z is oxa or thia, and R, $R^1$, X and $n$ are as defined herein, is reacted with an alkali metal compound such as sodamide, potassium amide, lithium amide or the like to form its corresponding anion. It has been discovered that this reaction is preferably carried out in a liquid ammonia solvent in a Dry Ice-acetone bath or other means known to the art for maintaining ammonia in a liquid state, and $R^1$ must be other than hydrogen.

The anion thus formed is then condensed with an amino-alkyl halide having the formula:

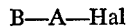

wherein A and B are as hereinabove defined and Hal is halogen, e.g., chloro-, bromo-, iodo-, and so forth, with the bromo-derivatives thereof being the preferred embodiment of this invention.

Alternatively, products of this invention may be obtained by interaction of a compound of Formula II with an alkylenedihalide, e.g., trimethylene chlorobromide or ethylene chlorobromide. The intermediate thus formed has the formula

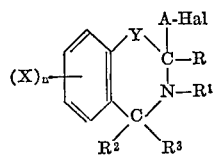

wherein A, R, $R^1$, $R^2$, $R^3$, X, $n$ and Hal are as herein described. It is then reacted with an alkali metal halide, such as sodium iodide and a basic nitrogen-containing reagent, such as H—B wherein B is as hereinabove defined to give the product of Formula I.

Additional solvents which may be utilized in the practice of this invention are non-polar solvents, such as ether, tetrahydrofuran, ether, diethylene glycol, dimethyl ether and hydrocarbons, such as benzene, toluene, xylene, and the like.

To prepare compounds of Formula I wherein $R^1$ is hydrogen, and $R^2$ and $R^3$ together are oxo, the corresponding benzyl derivative, i.e., where $R^1$ is benzyl, is treated with sodium in a liquid ammonia solvent.

The products of Formula I wherein $R^2$ and $R^3$ separately are hydrogen are prepared by reducing the corresponding oxo compounds with a reducing agent, such as lithium aluminum hydride.

The reagents of Formula II wherein Z is S may be prepared in accordance with the procedure set forth in an article by Moreau and Delacoux, Bull. Soc. Chim., France, 1962, p. 502. However, the starting materials of Formula II wherein Z is S are preferably prepared by reacting thiosalicylic acid, or $(X)_n$-substituted derivative thereof with an imino compound having the formula:

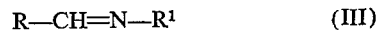

wherein R and $R^1$ are as defined herein.

Suitable derivatives of thiosalicylic acid are:

3-butyl-2-mercaptobenzoic acid;
4-octyl-2-mercaptobenzoic acid;
3-methyl-5-butyl-2-mercaptobenzoic acid;
3-isobutoxy-2-mercaptobenzoic acid;
6-methyl-2-mercaptobenzoic acid;
5-nitro-3-heptyl-2-mercaptobenzoic acid;
3,5-dichloro-2-mercaptobenzoic acid;
3,4,5,6-tetrafluoro-2-mercaptobenzoic acid;
4-pentylthio-2-mercaptobenzoic acid; and
5-trifluoromethyl-2-mercaptobenzoic acid.

The reagents, when Z is oxa (O) in Formula II, are prepared beginning with the method disclosed by Horrom and Zaugg, Journal of American Chemical Society, 72, p. 721 (1950), yields compounds wherein $R^1$ is hydrogen. These products are thereafter condensed with compounds having the formula

wherein $R^1$ is as defined herein and is other than hydrogen and Hal is as defined herein, in the presence of reagents, such as an alkali metal hydride, e.g., sodium hydride or lithium hydride; alkali metal hydroxides, e.g., potassium hydroxide or sodium hydroxide or alkali metal amides, e.g., lithium amide or sodium amide, at elevated temperatures.

Examples of compounds of Formula II where Z is oxa that may be utilized in the practice of the invention are:

3-ethyl-2,3-dihydro-2-phenyl-4H-1,3-benzoxazin-4-one;
3-butyl-2,3-dihydro-7-methoxy-2-(m-methoxyphenyl)- 4H-1,3-benzoxazin-4-one;
8-chloro-3-ethynyl-2,3-dihydro-2-(tetrahydro-2-furyl)- 4H-1,3-benzoxazin-4-one;
6,7-dichloro-2-(o-chlorophenyl)-2,3-dihydro-3-methyl- 4H-1,3-benzoxazin-4-one; and
2,3-dihydro-3-methyl-2-phenyl-7-(trifluoromethyl)- 4H-1,3-benzoxazin-4-one.

Suitable reagents of Formula III may be utilized are: benzalmethylimine, benzalethylimine, 4 - chlorobenzalmethylimine, 2-methoxybenzalmethylimine, 2-furylmethylimine, 2-thienylethylimine, 2-naphthylethylimine and 2-pyridylethylimine.

Compounds of Formula I wherein $R^2$ and $R^3$ together is oxo (O=) may be reduced as by treatment with a reducing agent, such as lithium aluminum hydride in an organic solvent, such as ether or tetrahydrofuran to give the compound wherein $R^2$ and $R^3$ are hydrogen.

The nitro-derivatives of compounds of Formula I, wherein X is nitro, may be reduced by reacting them with a reducing agent, such as stannous chloride, to form the amino derivatives thereof.

The hydroxy derivative of compound I may be formed by reacting a compound wherein X is alkoxy with concentrated hydrochloric acid or with pyridine hydrochloride. Final product I may be converted to its corresponding sulfone and sulfoxide derivatives by oxidation. Compound I may be reacted with hydrogen peroxide to yield the sulfoxide while if it is reacted with potassium permanganate, the sulfones will be produced.

To form the acid-addition or the quaternary ammonium salts, the free base initially formed is interacted with at least one equivalent of the desired acid or quaternary ammonium hydrocarbon halide.

The following examples are illustrative of the invention. All temperatures are in degrees centigrade unless otherwise specified.

EXAMPLE 1

2-(2-dimethylaminoethyl)-2,3-dihydro-3-methyl-2-phenyl-4H-1,3-benzothiazin-4-one, hydrochloride (a) 2,3 - dihydro - 3 - methyl-2-phenyl-2H-1,3-benzothiazin-4(3H)-one.—A suspension of 167 g. (1.05 mole) of thiosalicyclic acid in 300 ml. of xylene was treated with 125.0 g. (1.05 mole) of benzalmethylimine (prepared from benzaldehyde and methylamine in a 94% yield) in 300 ml. of xylene. The mixture was stirred and then refluxed for two hours while 17 ml. of water was collected during this period (14 ml. after fifteen minutes). About 350 ml. was distilled at atmospheric pressure and the residue was cooled and diluted with 300 ml. of ether. This solution was washed with 200 ml. of 5% NaHCO₃ (three times) 200 ml. of water (three times), dried (MgSO4), treated with Darco (charcoal) and filtered. The filtrate was concentrated under reduced pressure to give 273 g. of nearly colorless granular material, M.P. 79–92°. After crystallization from 250 ml. of toluene-500 ml. of hexane, the nearly colorless product weighed 228.4 g.; M.P. 80–82°.

(b) 2-(2-dimethylaminoethyl)-2,3-dihydro-3-methyl-2-phenyl-4H-1,3-benzothiazin-4-one, hydrochloride.—To a 1 l. flask, equipped with stirrer and condenser (cooled in a Dry Ice bath), was added 500 ml. of liquid $NH_3$ and 100 mg. of ferric nitrate and then 4.0 g. (0.1 g. atom) of K metal. The deep blue solution resulting was stirred for one hour and treated with 25.5 g. (0.1 mole) of the material from part (a) (finely-divided) in one portion. The resulting mixture was stirred for one hour and treated with a toluene solution of 2-dimethylaminoethyl bromide (prepared by treating a suspension of 46.0 g. of the HBr in 15 ml. of water with a solution of 30 g. of $K_2CO_3$ in 25 ml. of water and extracting the liberated base with 110 ml. of toluene (in three portions)—the combined toluene phases were dried over MgSO₄). The mixture became lighter in color indicating an immediate reaction and was then stirred for about an additional six hours in the Dry Ice-acetone bath. The $NH_3$ was allowed to evaporate from the reaction mixture. The residue was warmed to 70° to remove the bulk of the remaining $NH_3$—, cooled and diluted to 500 ml. with toluene. This solution was washed with 50 ml. of water, twice with 25 ml. of water and then extracted with a solution of 15 ml. of concentrated HCl in 150 ml. of water. The acidic aqueous extract was treated with a solution of 10 g. of sodium hydroxide in 25 ml. of water and the liberated base extracted with 150 ml. of ether (three times). The ether phases were combined, dried (MgSO₄), treated with Darco and filtered. Evaporation of the solvent gave 25.2 g. of yellow oil. After standing overnight, the mixture was treated with 300 ml. of ether and 25 ml. of water and shaken. The organic phase was washed with 25 ml. of water, dried (MgSO₄) and concentrated to give 22.4 g. of yellow product. Fractionation of this material yielded a forerun (B.P. 150–177° at 0.1 mm.) and 16.5 g. of a viscous yellow distillate, B.P. 177–179° (0.1 mm.). Part of the latter material (16.1 g.) was dissolved in 50 ml. of ethanol and treated with 8.2 ml. of 6.0 N alcohol HCl. The products crystallized from the yellow solution, diluted to 400 ml. with ether and the mixture cooled for several hours in the cold room. The mother liquor was decanted from the yellow amorphous solid and the latter treated with 50 ml. of acetonitrile (this solvent dissolved the yellow gummy material which adhered to the product) and cooled. The solid was filtered and washed with cold acetonitrile and ether to give 10.4 g. of nearly colorless product, M.P. 273–275° (dec.). After crystallization from 650 ml. of ethanol, the colorless product weighed 8.5 g., M.P. 275–277° (dec.).

EXAMPLE 2

2-(2-diethylaminoethyl)-3-methyl-2-phenyl-2H-1,3-benzothiazin-4-(3H)-one, hydrochloride 51.0 grams of 2-methyl-2-phenyl-2H-1,3-benzothiazin-4-(3H)-one, 8.0 grams of potassium and 0.22 mole of 2-diethylaminoethyl bromide in 200 ml. of toluene were reacted in 1 liter of liquid ammonia and 100 mg. of ferric nitrate according to the procedure described in Example 1 to give 56.0 g. of the unpurified pale yellow free base. After an initial rapid distillation, the distillate (47.5 g. of dark orange liquid, B.P. 200–220° at 0.1 mm.) was redistilled to give 39.7 g. of pale orange product, B.P. 190–200 (0.1 mm.). This material was dissolved in 100 ml. of ethanol, treated with 18.7 ml. of 6.0 N alcoholic hydrogen chloride and the resulting solution was diluted to 1 l. with ether to give 40.0 g. of pale yellow solid, M.P. 200–210°. After crystallization from 900 ml. of acetonitrile (Darco-treated), the pale yellow solid weighed 19.8 g., M.P. 222–226°. This material was recrystallized from (1) 280 ml. ethanol, (2) 50 ml. DMF and (3) 165 ml. methanol-800 ml. of ether to give 15.5 g. pale yellow crystalline product; M.P. 226–228°.

EXAMPLE 3

2-(3-dimethylaminopropyl) - 2,3 - dihydro - 3 - methyl-2-phenyl-4H-1,3-benzothiazin-4-one, hydrochloride To a stirred suspension of 100 mg. of ferric nitrate in 1 liter of liquid ammonia (cooled in a Dry Ice-acetone bath) was added 1.4 g. of lithium ribbon. The resulting deep blue solution was stirred for one hour and treated with a solution of 51.0 g. of material from part (a) of Example 1 in 200 ml. of toluene. The resulting solution was stirred for one hour and treated with 230 ml. of 1.3 M solution of 3-dimethylaminopropyl bromide. A precipitate separated from the mixture. After stirring the mixture for six additional hours in the Dry Ice-acetone bath, the ammonia was allowed to evaporate overnight and the product isolated in the same manner as in Example 1 to give 37.4 g. of a yellow syrup. This material was dissolved in 50 ml. of ethanol and treated with 19.0 ml. of 5.8 N alcoholic HCl. This solution was diluted to 600 ml. with ether to give 30.9 g. of a pale yellow product. The latter was digested in 50 ml. of warm ethanol, cooled and filtered to give 26.1 g. of colorless product, M.P. 243–245° (s. 235°). After recrystallization from acetonitrile, the product melted at 245–247°.

EXAMPLE 4

2-(2-diethylaminoethyl)-2,3-dihydro-phenethyl-2α-furyl-3-4H-1,3-benzothiazin-4(3H)-one, hydrochloride (a) 2-3-dihydro - 3 - phenethyl - 2α - furyl - 2H - 1,3-benzothiazin-4(3H)-one.—2,3 - dihydro - 3 - phenethyl-2α-furyl-2H-1,3-benzothiazin-4(3H)-one is prepared by substituting phenethyl-2-furfuralimine for the benzalmethylimine of part (a) of Example 1.

(b) 2 - (2 - diethylaminoethyl) - 2,3 - dihydro - 2α-furyl - 3 - phenethyl - 4H - 1,3 - benzothiazin - 4(3H)-one hydrochloride.—2 - (2 - diethylaminoethyl) - 2,3 - dihydro - 2α - furyl - 3 - phenethyl - 4H - 1,3 - benzothiazin-4(3H)-one hydrochloride is prepared by reacting the product of (a) above with 2-diethylaminoethyl bromide according to the procedure of part (b) of Example 1.

EXAMPLE 5

2-(2-morpholinoethyl)-2,3-dihydro-3-methyl-2-phenyl-4H-1,3-benzothiazin-4(3H)-one hydrochloride 2 - (2 - morpholinoethyl) - 2,3 - dihydro - 3 - methyl-2-phenyl-4H-1,3-benzothiazin-4(3H)-one is obtained by substituting 2-morpholinoethyl iodide for 2-dimethylaminoethyl bromide in the procedure used in part (b) of Example 1.

EXAMPLE 6

2-[3-(4β-hydroxyethylpiperazino)propyl] - 2,3 - dihydro-2 - methyl - 2 - phenyl - 4H - 1,3 - benzothiazine-4-one hydrochloride (a) 2 - (3 - chloropropyl) - 2,3 - dihydro - 2 - methyl-2-phenyl-4H-1,3-benzothiazin-4-one.—Following the procedure of Example 3 but substituting 32.0 g. of trimethylene chlorobromide for the 3-dimethylaminopropyl bromide and allowing the solvent to evaporate, 2-(3-chloropropyl) - 2,3 - dihydro - 2 - methyl - 2 - phenyl - 4H - 1,3-benzothiazin-4-one is obtained.

(b) 2 - [3 - (4β - hydroxyethylpiperazino)propyl]-2,3 - dihydro - 2 - methyl- 2 phenyl - 4H - 1,3-benzothiazine - 4 - one hydrochloride.—A mixture of equivalent quantities of the material from part (a) and sodium iodide in butanone was refluxed for one hour and treated with excess 4-(β-hydroxyethyl)piperazine and then refluxed for four hours. The solvent was evaporated and the residue was treated with ether and water. Evaporation of the ether phase gave 2-[3-(4β-hydroxyethylpiperazino)propyl]-2,3-dihydro-2-methyl - 2 - phenyl-4H-1,3-benzothiazin-4-one.

EXAMPLE 7

2-(2-dimethylaminoethyl)-2,3-dihydro-3-methyl-2-phenyl-4H-1,3-benzoxazin-4-one, hydrochloride (a) 2,3 - dihydro - 3 - methyl - 2 - phenyl - 2H - 1,3-benzoxazin-4-one.—Treatment of equivalent quantities of 2,3-dihydro-2-phenyl-2H-1,3-benzoxazine-4-one, sodium amide and methyl iodide in toluene yields 2,3-dihydro-3-methyl-2-phenyl-2H-1,3-benzoxazine-4-one.

(b) 2 - (2 - dimethylaminoethyl) - 2,3 - dihydro-3-methyl - 2 - phenyl - 4H - 1,3 - benzoxazin - 4 - one, hydrochloride.—Following the procedure of part (b) of Example 1 but utilizing the material from part (a) of Example 7 in place of 2,3-dihydro-3-methyl-2-phenyl-4H-1,3-benzothiazin - 4 - one, 2-(2-dimethylaminoethyl)-2,3 - dihydro - 3 - methyl - 2 - phenyl - 4H - 1,3 - benzoxazin - 4 - one, hydrochloride is obtained.

EXAMPLE 8

2-(2-piperidinoethyl)-2,3-dihydro-3-methyl-2-phenyl-4H-1,3-benzoxazin-4-one, hydrochloride By substituting 2-piperidinoethyl bromide for the 2-dimethylaminoethyl bromide in the procedure of Example 7, 2-(2-piperidinoethyl) - 2,3 - dihydro-3-methyl-2-phenyl-4H-1,3-benzoxazin-4-one, hydrochloride is obtained.

EXAMPLE 9

2-(2-pyrrolidinoethyl)-2,3-dihydro-3-propyl-2-phenyl-4H-1,3-benzothiazin-4-one, hydrochloride (a) 2,3 - dihydro - 3 - propyl - 2 - phenyl - 2H - 1,3-benzothiazin - 4(3H) - one.—2,3-dihydro - 3 - propyl-2-phenyl-2H-1,3-benzothiazin-4-(3H)-one is prepared by substituting benzalpropylimine for the benzalmethylimine in part (a) of Example 1.

(b) 2 - (2 - pyrrolidinoethyl) - 2,3 - dihydro - 3 - propyl - 2 - phenyl - 4H - 1,3 - benzothiazin - 4 - one hydrocloride.—2 - (2 - pyrrolidinoethyl) - 2,3-dihydro - 3 - propyl 2 - phenyl - 4H - 1,3-benzothiazin - 4 - one is prepared by reacting the product (a) above with 2-pyrrolidinoethyl iodide according to the procedure of Example 2.

EXAMPLE 10

2 - dimethylaminoethyl - 2,3 - dihydro - 2 - (3 - chlorophenyl) - 3 - methyl - 6 - chloro - 4H - 1,3-benzothiazin - 4 - one, hydrochloride (a) Following the procedure of part (a) of Example 1, but utilizing 5-chloro-2-mercaptobenzoic acid in lieu of thiosalicylic acid and 3-chlorobenzalmethylimine in lieu of benzalmethylimine, 2,3-dihydro-3-methyl-2-(3-chlorophenyl) - 6 - chloro - 2H-1,3-benzothiazin-4(3H)one is obtained.

(b) Reacting the product of (a) above with dimethylaminoethyl bromide in accordance with part (b), Example 1 yields 2-dimethylaminoethyl-2,3-dihydro-2-(3-chlorophenyl) - 3-methyl-6-chloro-4H-1,3-benzothiazin-4-one, hydrochloride.

EXAMPLE 11

2 - (2 - dimethylaminoethyl)-2,3-dihydro-2-(3-methoxyphenyl) - 3 - methyl-6-trifluoromethyl-4H-1,3-benzothiazin-4-one, hydrochloride Following the procedure of Example 10 but utilizing 5-trifluoromethyl-2-mercaptobenzoic acid in lieu of 5-chloro-2-mercaptobenzoic acid and 3-methoxybenzalmethylimine in lieu of 3-chlorobenzalmethylimine, 2-(2-dimethylaminoethyl) - 2,3-dihydro-2-(3-methoxyphenyl)-3-methyl - 6 - trifluoromethyl - 4H-1,3-benzothiazin-4-one, hydrochloride is obtained.

EXAMPLE 12

2 - (2 - dimethylaminoethyl)-2,3-dihydro-2-(3-hydroxyphenyl) - 3 - methyl-6-trifluoromethyl-4H-1,3-benzothiazin-4-one, hydrochloride A mixture of material from Example 11 and excess pyridine hydrochloride is heated at 200° for thirty minutes. The excess pyridine hydrochloride is removed at reduced pressure to give 2-(2-dimethylaminoethyl)-2,3-dihydro - 2-(3-hydroxyphenyl)-3-methyl-6-trifluoromethyl-4H-1,3-benzothiazin-4-one, hydrochloride.

EXAMPLE 13

2-(2-dimethylaminoethyl)-2,3-dihydro-6-nitro-2-phenyl-3-methyl-4H-1,3-benzothiazin-4-one, hydrochloride Following the procedure of Example 1 but substituting 5-nitro-2-mercaptobenzoic acid for the thiosalicyclic acid in part (a), 2 - (2 - dimethylaminoethyl)-2,3-dihydro-6-nitro-2-phenyl-3-methyl-4H-1,3-benzothiazin-4-one, hydrochloride is obtained.

EXAMPLE 14

2-(2-dimethylaminoethyl)-2,3-dihydro-6-amino-2-phenyl-3-methyl-4H-1,3-benzothiazin-4-one Treatment of the material from Example 13 with an equivalent quantity of stannous chloride dihydrate in a mixture of methanol and acetic acid in the usual manner, 2 - (2-dimethylaminoethyl)-2,3-dihydro-6-amino-2-phenyl-3-methyl-4H-1,3-benzothiazin-4-one is obtained.

Example 15

2-(2-dimethylaminoethyl)-2,3-dihydro-3-benzyl-2-phenyl-4H-1,3-benzothiazin-4-one, hydrochloride Following the procedure of Example 1 but utilizing N-benzylbenzalimine in place of the benzalmethylimine in part (a), 2-(2-dimethylaminoethyl)-2,3-dihydro-3-benzyl-2 - phenyl - 4H-1,3-benzothiazin-4-one, hydrochloride is obtained.

Example 16

2-(2-dimethylaminoethyl)-2,3-dihydro-2-phenyl-4H-1,3-benzothiazin-4-one

A mixture of the material from Example 15 and liquid ammonia was treated portionwise with a slight excess of metallic sodium. The ammonia was allowed to evaporate to give 2 - (2-dimethylaminoethyl)2,3-dihydro-2-phenyl-4H-1,3-benzothiazin-4-one.

EXAMPLE 17

2,3-dihydro-3-methyl-2-phenyl-2H-1,3-benzothiazin-4(3H)-one-S-dioxide

To a solution of potassium permanganate, 2,3-dihydro-3 - methyl - 2-phenyl-2H-1,3-benzothiazin-4(3H)-one is added and the desired product recovered.

EXAMPLE 18

2,3-dihydro-3-methyl-2-phenyl-2H-1,3-benzothiazin-4(3H)-one-S-oxide

Repeating the procedure of Example 17 but utilizing hydrogen peroxide in lieu of permanganate, the desired product is recovered.

EXAMPLE 19

2-[2-(dimethylamino)ethyl]-3,4-dihydro-3-methyl-2-phenyl-2H-1,3-benzothiazine

Treating 5.0 grams with the product of Example 1(b) with lithium aluminum hydride yields 2-[2-dimethylamino)ethyl] - 3,4 - dihydro-3-methyl-2-phenyl-2H-1,3-benzothiazine.

EXAMPLE 20

2,3-dihydro-3-methyl-2-phenyl-2H-1,3-benzothiazin-4(3H)-one, methochloride

A solution of the free base of the material from Example 1(b) in acetonitrile is cooled and treated with methyl chloride. The solution is allowed to stand for a day at room temperature and the solvent removed under reduced pressure to give the desired product.

The invention may be variously otherwise embodied within the scope of the appended claims.

What is claimed is:

1. A compound of the formula

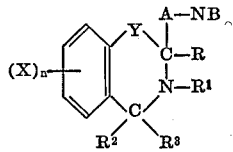

optically active isomers and salts thereof, wherein Y is thia (—S—), sulfone (—SO$_2$—), and sulfoxide (—SO—); R is X-substituted phenyl, furyl, thienyl, pyridyl or naphthyl; R$^1$ is hydrogen, lower alkyl, halo lower alkyl, benzyl, X-substituted benzyl, allyl, propargyl, cinnamyl or cyclopropyl; R$^2$ and R$^3$ taken together are oxa and separately are hydrogen; X is hydrogen, lower alkyl, lower alkoxy, amino, dialkylamino, halo, lower alkylthio, hydroxy, cyano, nitro or trifluoromethyl; n is one to two; A is lower alkylene; and NB is a basic nitrogen-containing radical selected from the group consisting of amino, (lower alkyl)amino, di(lower alkyl)amino, (hydroxy-lower alkyl)amino, di(hydroxy-lower alkyl) amino, (phenyl-lower alkyl)amino, (lower alkyl), (phenyl-lower alkyl)amino, piperidyl; (lower alkyl) piperidyl; 4-(N-lower alkyl)piperidyl; hydroxy piperidyl; (lower alkoxy)-piperidyl; pyrrolidyl; (lower alkyl)pyrrolidyl; (lower alkoxy)-pyrrolidyl; morpholino; (lower alkyl)morpholino; di(lower alkyl)morpholino; (lower alkoxy)morpholino; thiamorpholino; (lower alkyl)thiamorpholino; di(lower alkyl)thiamorpholino; lower alkoxy)thiamorpholino; piperazyl; (lower alkyl)piperazyl; di(lower alkyl)piperazyl; (lower alkoxy)piperazyl; (hydroxy-lower alkyl)piperazyl; alkanoyloxy lower-alkyl piperazyl; (hydroxy-lower alkoxy-lower alkyl)piperazyl; di(lower alkyl)amino-(lower alkyl)piperazyl; di(lower alkyl)-amino-(lower alkoxy-lower alkyl)piperazyl; phenyl piperazino; homopiperazyl, N$^4$-ethylhomopiperazino, N$^4$-benzylhomopiperazino, N$^4$-(p-hydroxyphenyl)homopiperazino, N$^4$-(o-acetoxybenzyl) homopiperazino and N$^4$-(hydroxyethyl)homopiperazino.

2. A compound in accordance with claim 1 having the name 2 - (2-dimethylaminoethyl)-2,3-dihydro-3-methyl-2-phenyl-4H-1,3-benzothiazin-4-one, hydrochloride.

3. A compound in accordance with claim 1 having the name 2-(2-diethylaminoethyl)-3-methyl-2-phenyl-2H-1,3-benzothiazin-4-(3H)-one, hydrochloride.

4. A compound in accordance with claim 1 having the name 2-(3-dimethylaminopropyl)-2,3-dihydro-3-methyl-2-phenyl-4H-1,3-benzothiazin-4-one, hydrochloride.

5. A compound having the formula

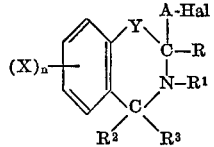

wherein A, Y, R, R$^1$, R$^2$, R$^3$, X and n are as described in claim 1 and Hal is halogen.

6. A compound in accordance with claim 1 having the name 2 - [3-(4β-hydroxyethylpiperazino)propyl]-2,3-dihydro-2-methyl-2-phenyl-4H-1,3-benzothiazine-4-one.

References Cited

Conti et al.: Chemical Abstracts, vol. 54, cols. 22656–7 (1960).

Kurihara et al.: Chemical Abstracts, vol. 59, col. 2806 (1963).

HENRY R. JILES, Primary Examiner

JOHN M. FORD, Assistant Examiner

U.S. Cl. X.R.
260—240, 244, 999